United States Patent [19]

Takahashi et al.

[11] Patent Number: 5,342,923
[45] Date of Patent: Aug. 30, 1994

[54] PROCESS FOR REFINING ZEIN

[75] Inventors: Hidekazu Takahashi; Norimasa Yanai, both of Funabashi, Japan

[73] Assignee: Showa Sangyo Co., Ltd., Tokyo, Japan

[21] Appl. No.: 874,864

[22] Filed: Apr. 28, 1992

[30] Foreign Application Priority Data

Jan. 16, 1992 [JP] Japan .................. 4-024387

[51] Int. Cl.⁵ .............................. C07G 7/00; A23J 1/12
[52] U.S. Cl. ...................... 530/373; 530/374
[58] Field of Search ................... 530/373, 374

[56] References Cited

U.S. PATENT DOCUMENTS 2,388,389 11/1948 Carter et al. .
3,535,305 10/1970 Carter et al. .

FOREIGN PATENT DOCUMENTS 50-16800  6/1975  Japan .
61-167700 7/1986  Japan .
63-185999 8/1988  Japan .
117893    4/1991  Japan .

OTHER PUBLICATIONS

"Industrial and Engineering Chemistry", vol. 33, No. 3, pp. 394–398.
"Seed Proteins Biochemistry, Genetics, Nutritive Value", pp. 271–287.

*Primary Examiner*—Howard E. Schain
*Assistant Examiner*—Phyn Touzeau
*Attorney, Agent, or Firm*—Nikaido, Marmelstein, Murray & Oram

[57] ABSTRACT

There is disclosed a process for refining a zein. A solution containing crude zein, as a raw material is finely dispersed into absolute or high purity acetone solution having no ability for dissolving the zein, to cause precipitation of a zein component, as porous solids.

6 Claims, No Drawings

PROCESS FOR REFINING ZEIN

BACKGROUND OF THE INVENTION

1. Field of the Invention

The present invention relates to a process for refining a zein, and more particularly a process for treating a solution containing crude zein with an acetone solution to remarkably decrease inherent smell and color thereof.

2. Related art

Zein is a main component of corn proteins and dissolves in various alcohols and alkali solutions. The zein solution shows adhesiveness and has an ability to form films and fibers. For instance, when the zein solution is applied by spraying, dipping or the like on the surface of an object and dried, a film is formed thereon, which has excellent water, acid and heat resistance. It also has excellent electric insulation ability. Therefore, zein has widely been employed as a raw material for preparing waterproof materials for papers, paint for wood works, adhesive for plywoods, damp-proofing agents, coating agents for foods and tablets (medicine), and the like.

Various processes have been proposed for extracting and refining the zein.

In Jap. Pat. No. Sho 61 (year of 1986) - 167700(A) and Martinue NiJhoff et al "Seed Proteins Biochemistry, Genetics, Nutritive Value", page 275–285 (1983), there are described extraction processes, wherein corn gluten meal or the like material containing the zein is treated with 70–90% (V/V) ethyl alcohol about 90% (V/V) isopropyl alcohol or the like water-containing lower alcohol solution, and distilling out the alcohol to obtain the zein. In Jap. Pat. No. Sho 50 (year of 1975) - 16800(B), there is described a process, wherein the zein is extracted from wheat gluten with 60–95% (V/V) aqueous acetone, methylethylketone or diethyleneglycol solution under stirring at temperature of 50°–70° C.

The zein obtained by the above conventional processes has an inherent smell and color and thus can not sufficiently satisfy recent severe requirements in food, medicine preparation and other industries. Further, it is difficult to supply a stable zein product with nice quality, because of the fluctuation in quality of the raw materials to be used, when such conventional processes are applied.

As processes for treating the zein, there are those, wherein the zein containing alcohol or alkali solution is cooled to cause a precipitation of the zein component and the resulting block-like precipitate is dried ["Industrial and Engineering Chemistry", Vol. 33, No.3, page 394 (1941)], and wherein the zein solution is poured into water or salt solution, for instance sodium chloride solution, to cause a precipitation of the zein and the resulting precipitate is dried to obtain the zein product which has good solubility in ethyl alcohol [Jap. Pat. No. Sho 63 (year of 1988) - 185999(A)].

The former process has disadvantages in that the block-like precipitate is difficult to wash. Further, the solution should be kept at a temperature of −20° C. or below in order to avoid denaturation of the zein due to the water contained therein. The severe cooling condition and subsequent drying increase the cost. While, the latter refining process also has disadvantages in that the color and smell can not be removed sufficiently, cooling of the precipitate is required to avoid denaturation and freeze-drying of the precipitate results in an increase of a cost.

In view of such technical state of the arts, the present inventors have proposed in the specification of Japanese Patent Application No. Hei 3 (1991) - 117893 which substantially corresponds to United States application Ser. No. 07/868,907 a process for treating zein containing material to decrease at its smell and color, by combining the extraction of zein component with an alcohol, and more particularly ethyl alcohols and purification or washing of the zein component with acetone solution.

However, the zein treated by the last-mentioned process is not perfect with respect to the disappearance of its smell and color, and may cause some denaturing thereof during its drying step and holding period of time.

SUMMARY OF THE INVENTION

Therefore, an object of the present invention is to provide a process for refining a zein, which satisfies the following requirements.

i) Providing of excellent product which has almost no smell, and a color tone of near pure or snow white;
ii) Improving its solubility in to alcohols and the like;
iii) Providing dried product which is easy to make into a powder; and
iv) Suppressing the denaturing of the product.

According to the invention, the object can be attained by a process for refining the zein, which comprises steps of dispersing a solution containing etude zein into an acetone solution of high purity to cause a precipitation of zein component, as porous solids, and separating and drying the solids.

In this specification, the term "solution containing crude zein" means the followings.

a) A solution prepared by dissolving crude zein into a solvent comprising a monohydric alcohol having 1–4 carbon atoms, propylene glycol, ethylene glycol, aqueous acetone solution, an alkali solution or the like, or any mixture thereof, and
b) A solution which is obtained when zein is extracted from pulverized corn, pulverized wheat, gluten meal and the like raw material.

To obtain desirable products, it is preferable that the viscosity of the solution containing the etude zein is not more than 100000 cps. The term "acetone solution of high purity" means absolute acetone or an aqueous acetone solution with acetone concentration near that of absolute acetone.

The dispersion of etude zein containing solution into the high purity acetone solution can be carried out by a method known per se, for instance jetting the etude zein containing solution into acetone solution through a nozzle; adding dropwise or threadwise the crude zein containing solution into the acetone solution; gradually pouring the crude zein containing solution into the acetone solution, while agitating the latter; spraying the crude zein containing solution into the acetone solution; or any combination of the above.

The ratio between the crude zein containing solution and acetone solution depends on the treating absolute the moisture or water content of the crude zein containing solution. When the treatment is carried out at room temperature, it is necessary to control the amount of adding crude zein containing solution which is treated so that the moisture content of the mixture does not exceed 2–3% in the acetone solution. This is because if the dispersion contains more than 2 to 3% moisture, the zein component precipitates in a nougat state and makes the subsequent operations difficult. However, the crude zein containing solution can be added in larger amounts, when treating acetone is employed which has been cooled to below room temperature.

The solids which can be obtained by carrying out the process of present invention will have various shape of blocks, threads, needles, flakes, grains or powders depend on the methods selected for dispersing the crude zein containing solution into the acetone solution, but all are porous, so that they can be sufficiently washed by an acetone solution, which rapidly decreases their smell and color, and the particles can easily be crushed.

According to the invention, the solids of zein component are formed in an acetone solution containing at most almost no water, so that the subsequent separation and drying steps can easily be carried out without requiring freeze-drying.

DETAILED DESCRIPTION OF PREFERRED EMBODIMENTS

The invention will now be further explained in more detail with reference to Examples, Comparative Examples and Comparative Test Example.

EXAMPLE 1

To 50 g of corn gluten meal, were added 250 ml of 70% (V/V) acetone solution with stirring at 40° C. for 4 hours. After separation of solids, a filtrate which was formed was heated an amount sufficient to evaporate and to recover about half amount of the acetone which was fed, and to recover the zein component as a precipitate. The weight of this nougat-like precipitate was 32 g, with a solid content of 12.3 g. To the precipitate, there were added 35 ml of absolute acetone to obtain a honey-like viscous solution. The solution was added dropwise into 300 ml of absolute acetone, which was kept at 7° C., and agitated to form precipitates of the zein component therein. The acetone solution containing the precipitates was stirred for 1 hour, and their filtered and dried in vacuo to recover 10.2 g of white porous zein of a rice grain size.

EXAMPLE 2

50 g of 78.5% (V/V) acetone solution containing 20 g of crude zein were poured into 500 ml of absolute acetone solution which was charged and agitated in a homogenizer rotated at 10000 rpm to continue the agitation for 2 minutes. The resulting solids were separated by filtration and dried in vacuo to obtain 17.5 g of zein as a white powder.

EXAMPLE 3

60 g of 90% (V/V) aqueous ethyl alcohol solution containing 20 g of crude zein were added dropwise into 400 ml of absolute acetone which was kept at −10° C. and agitated. The agitation was continued for 1 hour. Resulting solids were separated by filtration and dried in vacuo to obtain 9.7 g of porous zein of rice grain size.

EXAMPLE 4

To 20 liters of absolute acetone, were added 79.2% (V/V) acetone solution containing 1 kg of crude zein by an air spray, usually used for painting, under a pressure of 2 kg/cm$^2$, with the nozzle thereof dipped into the absolute acetone, to form a cloud-like precipitate. Then the solution was left to stand for 20 minutes. Resulting solids were separated with a filter of 150 mesh, washed with 1 liter of absolute acetone and dried in vacuo to obtain 901 g. of zein in powder form.

COMPARATIVE EXAMPLE 1

To 50 g of corn gluten meal, were added 250 ml of 70% (V/V) acetone solution with stirring at room temperature for 4 hours. After separation of solids, a filtrate containing 16 g of zein was heated to vaporize and recover the acetone and to obtain a precipitate of the zein component. The weight of this nougat-like precipitate was 33 g, with a solid content of 2.5 g. The precipitate of nougat-like material, having a viscosity of more than 100000 cps, was added into 300 ml of absolute acetone which is kept at 7° C. and agitated to form a milky precipitate of zein component therein. The acetone solution containing the precipitate was stirred for 1 hour and filtered, and then dried in vacuo to recover 10.9 g of zein of rice grain size.

COMPARATIVE EXAMPLE 2

20 g of dried crude zein (semitransparent particles of about 0.5–1 mm) were added into 500 ml of 98% (V/V) acetone solution which was charged and agitated by a homogenizer rotated at 10000 rpm and the agitation continued for 2 minutes. Resulting solids were separated through filtration, dried in vacuo, and washed with 20 ml of absolute acetone and dried to obtain 16.9 g of zein as white powder.

COMPARATIVE TEST EXAMPLE

An intensity of color of the solution (Initial solution) containing crude zein or crude zein extract from corn gluten meal as well as a solution (Final solution) of the final zein product obtained by the Examples and Comparative Examples was checked with a spectrophotometer at 470 nm, which solutions were prepared by dissolving the product in 80% (V/V) aqueous ethyl alcohol to make its solid content of 3% (W/V).

Results are shown in following Table 1.

TABLE 1

|  | Initial solution (%) | Final solution (%) |
| --- | --- | --- |
| Example |  |  |
| 1 | 56.3 | 80.8 |
| 2 | 54.1 | 85.7 |
| 3 | 54.1 | 83.1 |
| 4 | 59.3 | 84.1 |
| Comparative Example |  |  |
| 1 | 54.9 | 71.6 |
| 2 | 54.1 | 79.4 |

What is claimed is:

1. A process for refining a zein, which comprises steps of dispersing a solution containing crude zein into a solution comprising acetone in which said zein is insoluble; thereby precipitating a zein component as porous solids; separating said porous solids; and drying said solids.

2. A process for refining zein as claimed in claim 1, wherein the solvent of said crude zein solution is selected from the group consisting of a monohydric alcohol having 1–4 carbon atoms, ethylene glycol, propylene glycol, an aqueous solution comprising acetone, an alkali solution, and mixtures thereof.

3. A process as claimed in claim 1, wherein said solution containing crude zein is a solution extracted from a material selected from at Least one member of the group consisting of pulverized corn, and gluten meal.

4. A process as claimed in claim 1 wherein said acetone is absolute.

5. A process for refining a zein as claimed in claim 1, further including dispersing said zein solution into the acetone by at least one process selected from the group consisting of jetting out the zein solution into the acetone through a nozzle; adding the zein solution into the acetone in the form of threads or drops; adding the zein solution into acetone while stirring or agitating the latter; and spraying the zein solution onto acetone; provided that said zein solution has a viscosity of not more than 100,000 cps.

6. A process as claimed in claim 1 wherein said process is carried out at about room temperature, provided that said dispersion of said zein solution in said acetone solution contains up to about 3% water.

* * * * *